United States Patent [19]

Gunmar et al.

[11] Patent Number: 5,442,804
[45] Date of Patent: Aug. 15, 1995

[54] METHOD FOR RESOURCE ALLOCATION IN A RADIO SYSTEM

[75] Inventors: Krister Gunmar; Ulf Tegth, both of Haninge, Sweden

[73] Assignee: Televerket, Farsta, Sweden

[21] Appl. No.: 752,511

[22] PCT Filed: Feb. 22, 1990

[86] PCT No.: PCT/SE90/00119
§ 371 Date: Oct. 25, 1991
§ 102(e) Date: Oct. 25, 1991

[87] PCT Pub. No.: WO90/10341
PCT Pub. Date: Sep. 7, 1990

[30] Foreign Application Priority Data

Mar. 3, 1989 [SE] Sweden ................. 8900742

[51] Int. Cl.$^6$ ................................ H04B 15/00
[52] U.S. Cl. .................... 455/33.1; 455/54.1; 455/62; 455/63; 455/67.3
[58] Field of Search .......... 455/33.1, 33.2, 33.3, 455/33.4, 54.1, 54.2, 56.1, 62, 63, 67.3, 67.6

[56] References Cited

U.S. PATENT DOCUMENTS

| | | | |
|---|---|---|---|
| 4,638,479 | 1/1987 | Alexis | 455/51.1 |
| 4,667,202 | 5/1987 | Kammerlander et al. | 455/67.6 |
| 4,736,453 | 4/1988 | Schloemer | 455/62 |
| 5,038,399 | 8/1991 | Bruckert | 379/59 |
| 5,151,704 | 9/1992 | Gunmar et al. | 455/33.3 |
| 5,179,722 | 1/1993 | Gunmar et al. | 455/67.3 |

Primary Examiner—Reinhard J. Eisenzopf
Assistant Examiner—Andrew Faile
Attorney, Agent, or Firm—Oblon, Spivak, McClelland, Maier & Neustadt

[57] ABSTRACT

The present invention relates to a method for resource allocation in a radio system comprising base stations with respective coverage areas and mobile units. The interaction between the stations in the system is defined with the aid of measured and/or calculated field strengths from all base stations on relevant traffic routes in the geographic area of the radio system, preferably in the form of an exclusion matrix. An allocating matrix is formed by compressing the exclusion matrix by means of an allocating algorithm. The algorithm utilizes figures of merit which are on the one hand calculated by mathematical/logical means to form possible combinations of stations and utilizes on the other hand a random technique for selecting one of these combinations. The algorithm is iterated a number of times and different allocations are obtained thanks to the random technique. The best one of the allocations from any point of view is selected.

7 Claims, 4 Drawing Sheets

METHOD FOR RESOURCE ALLOCATION IN A RADIO SYSTEM

FIELD OF THE INVENTION

The present invention relates to a method for resource allocation in a radio system. Radio systems can be one-way with communication in only one direction, for example paging system, or two-way, for example mobile radio system. In the application, a mobile radio system is preferably dealt with, but it is understood that the invention is equally well applicable to one-way systems. It is important in a mobile radio system that accessible frequency resources are used in such a manner that the system capacity is optimized with the condition that the customers experience an acceptable quality. In a microcell system in a densely populated area it is desirable that the channel allocation can be tailored to the current traffic distribution. Such planning is a very demanding task and there are great gains to be made if the system operator has full control over the inherent interferences in the system. Improved quality and traffic handling in a given frequency band is also equivalent to an increased frequency economy.

The following preconditions are given: a distribution of the traffic requirement over, for example, Stockholm, system parameters which define which C/I (carrier to interference) interference characteristic is required for good reception and how much interference the receiver tolerates in adjoining channels, and a frequency band of the system with a limited number of channels. It is the object to distribute the channels to the different base stations in the given frequency range so that the quality of the connection experienced by the customers meets given minimum requirements.

STATE OF THE ART

The literature on the subject supplies information on how the problem is solved in principle. The method is as follows: a systematic description is given of all restrictions which apply to channel allocation in the form of a so-called exclusion matrix. An exclusion matrix produces a description in symbolic form of how different base stations, alternatively mobiles in different coverage areas, can be shared with respect to co-channel and adjacent-channel conditions. Allocating algorithms are then used for finding exactly which channels the different base stations must have for the minimum requirement for connection quality to be met.

The exclusion matrix in turn enables an allocating program to be driven and channel allocations are obtained for a situation with very well known and desired interference characteristics which ensure a good connection quality.

Much is written in the literature about algorithms for frequency allocation (channel allocation) for telecommunication systems of different types. For example, William K. Hale mentions the following procedure which, simplified, consists of the following steps:

1. To define the current situation with a number of transmitters and their coverage area.
2. To number these transmitters.
3. To define in matrix form the relevant interaction between each transmitter and the coverage area of the other transmitters.
4. To carry out algebraic operations on rows in the matrix according to a predetermined scheme. In the same paper, this scheme constitutes the allocating algorithm.
5. The algorithm results in a changed matrix from which a channel allocation can be read out.

This procedure is deterministic which means that each time the algorithm is run through exactly the same allocation is obtained for one and the same constellation of transmitters. In an article by Andreas Gamst "A resource allocation technique for FDMA systems" published in Alta Frequenza, Vol. LVII-N.2 February-March 1988, a technique for resource allocation in a mobile radio system is described. The channel requirement and exclusion matrix is obtained by means of a data program (GRAND) which utilizes topographic data, predictions for wave propagation and a statistical model for station hand-over. For a cellular system, the lower limit for the requirement of the number of frequency channels is calculated. A heuristic allocating algorithm which provides a frequency allocation plan is iterated and the number of frequencies calculated for each frequency plan. The allocating algorithm includes a random control and the number of frequencies therefore does not become the same with each iteration. If the number of frequencies in a frequency plan is less than or equal to the calculated lower limit for the frequency requirement, an acceptable frequency plan has been found and the iterations are concluded.

BRIEF SUMMARY OF THE INVENTION

The present invention offers a new and improved allocating algorithm which on the one hand utilizes figures of merit calculated in a mathematical/logical way for forming possible combinations of stations and on the other hand utilizes a random technique for the selection of one of these combinations. The invention is specified in greater detail in the subsequent patent claims.

BRIEF DESCRIPTION OF THE DRAWINGS

The invention will now be described in greater detail with reference to the attached drawings, wherein.

DETAILED DESCRIPTION OF PREFERRED EMBODIMENTS OF THE INVENTION

Figure 1:
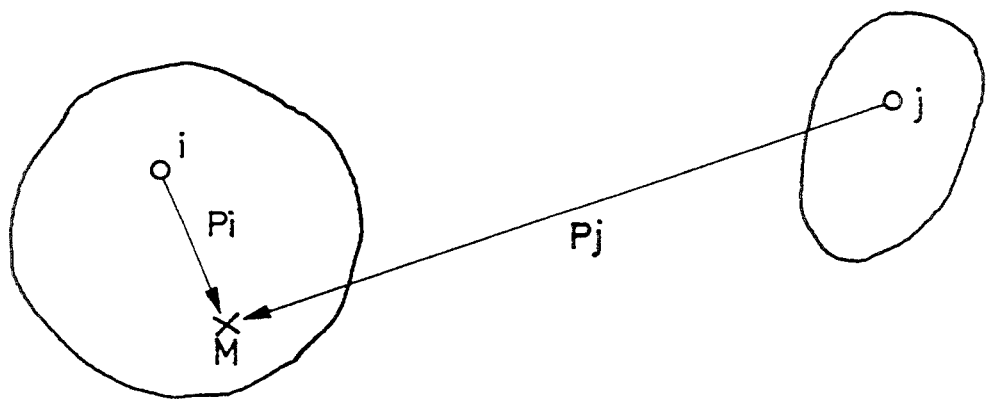
FIG. 1 illustrates how a mobile station is exposed to interference from an adjoining base station.

It is the object of the invention to effect resource allocation in a radio system. The prerequisites are that there are a number of base stations each with its own coverage area and a frequency band for the system with a limited number of channels. There is also a requirement for the type of C/I interference characteristic which is needed for good reception and how much interference the receiver tolerates in adjoining channels. The field strengths are measured along the relevant routes in the respective coverage areas. From the measured values the cross-interference matrices are calculated which indicate the interference characteristic between transmitters by means of numeric values. From the cross-interference matrices is calculated an exclusion matrix which indicates in symbolic form the interference characteristics between transmitters, and especially base stations. The channel allocation is carried out with the aid of the exclusion matrix.

Using a specially calibrated receiver equipment, the received power from all base stations is measured on the relevant traffic routes in the geographic area which is covered by the mobile radio system. For these measurements, the measured field strengths provide mean values over sections of 20 m (approximately 30 wavelengths) and each section is tied to a coordinate designation. The field strength values are represented in the measured material of the received signal power in dBm. The measurements are not as comprehensive as they could be since, in the same process, field strengths can be registered for up to 12 base stations at a time. It is quite possible to make all necessary measurements for a cell including coverage and interference range in one night. This type of measurement has already been successfully performed in the Stockholm area.

The measurements provide knowledge about what potential power a receiver in a mobile set will receive from different cells whilst the mobile is located in the geographic area. It is also easy to calculate the potentially received power at an arbitrary base station originating from mobile stations within the coverage area. Consequently the interference situation both for mobile stations and base stations is known.

Thus the exclusion matrix provides a systematic description in symbolic form of how different base stations or alternatively mobile stations in different coverage areas can be shared with respect to co-channel and adjacent-channel conditions.

The appearance of the matrix is based on which limit values are set for interference and coverage. It is important to understand that an exclusion matrix certainly contains information on how the channels can be arranged, but in spite of this is not a quantity which is based on frequency but only describes the relations between field strengths in the space.

Since the interferences can be described on the one hand with reference to the base station receivers and on the other hand with reference to the receiver of the mobile units there is both an uplinking matrix and a downlinking matrix. (Naturally only the downlinking matrix is used in paging systems.) If it were so in practice that different channel allocations could be used for uplinking and downlinking, each of these matrices could be directly used separately for constructing these allocations after symmetrization. However, it is intended to use the same allocation in both directions which implies that the allocating algorithms are applied to the union of these matrices.

The downlinking situation is shown in FIG. 1. Assuming that all the base stations together with the corresponding service areas are numbered from 1 to N. FIG. 1 shows two stations i and J with the associated service areas. A mobile station M in the i-th coverage area receives a desired power $P_i$ from its own base station and an unwanted interference power $P_j$ from base station number J. There is a small difference between the term "service area" and "coverage area". Coverage area here means all measured paths which, with respect to a given base station, have a sufficiently high received power to allow satisfactory reception. In the service area there can be points which have not been measured to have good reception.

The minimum allowable C/I (carrier to interference) noise ratio for acceptable co-channel quality is LP1 and the minimum allowable C/I for acceptable quality for interference in the first adjacent channel is LP2 and so forth. For adjacent channel (k−1):a, C/I must be greater than LPk, $k \leq M$. The noise figure p is defined as the fraction of the coverage area for which it holds true that $$P_i/P_j < LP_k$$

$K = 1, 2, \ldots M$

M constitutes the number of necessary co-channel and adjacent-channel limit values. The element $P_{ij}$ in a general N-th order cross-interference matrix is given by the relation $$P_{ii} (LP_k) = P$$

The diagonal elements are set to zero, that is to say $$P_{ij} (LP_k) = 0 \text{ for all i and k.}$$

This cross-interference matrix P refers to the downlinking situation and describes which degree of interference the mobile stations are subject to with respect to the transmitting base stations.

Figure 2:
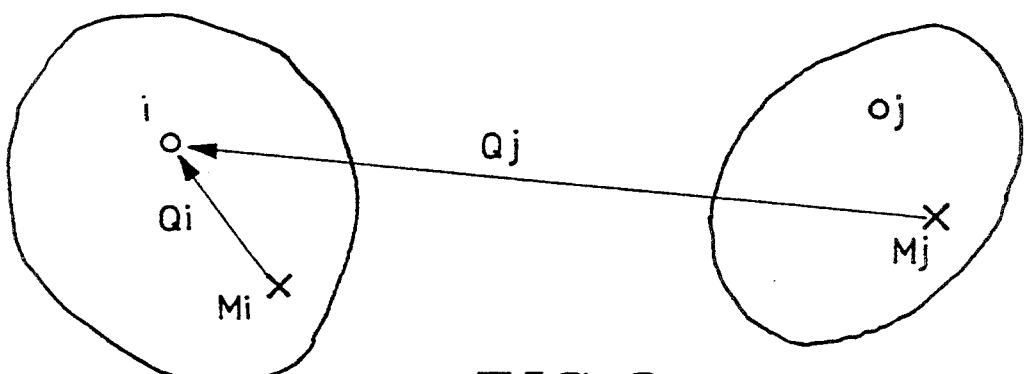
FIG. 2 illustrates how a base is exposed to interference from a mobile station in the adjoining area.

FIG. 2 illustrates the uplinking situation. The figure shows two base stations i and j with associated service areas. In this case the base station i is exposed to interference $Q_j$ from a mobile station $M_j$ in the coverage area of base station j. The base station i receives a wanted power $Q_i$ from a mobile station $M_i$ in its coverage area. The coverage areas are defined in the same way as before or possibly adjusted for any imbalance in the power budgets for uplinking and downlinking.

When the mobile station $M_j$ is assumed to pass through the entire coverage area of base j, an interference power is generated in the base station i. The interference power at the base station i which falls below y% of the coverage area in j is designated by $Q_{jy}$. Suitable values of y can be 50 or 90. The minimum allowable C/I noise ratio for an acceptable co-channel quality is designated by LQ2 and the minimum C/I for an acceptable quality for the first adjacent channel is designated by LQ2 and so forth. For the adjacent channel (k−1):a, C/I must be greater than $LQ_k$, $k \leq M$ in the same way as before.

The noise figure q is defined as the fraction of the coverage area of base i for which it holds true that $$Q_i/Q_{jy} < LQ_k$$

A general N-th order exclusion matrix is defined by the relation $$Q_{ij} (LQ_k) = q$$

The diagonal elements are set to zero in the same way as before, that is to say $$Q_{ii} (LQ_k) = 0 \text{ for all i and k.}$$

In this way, a cross-interference matrix for each $k = 1, 2 \ldots M$ is shown. This cross-interference matrix Q relates to the uplinking situation and describes which degree of interference the receivers in the base stations are subject to with respect to transmitting mobile stations.

Alternatively, the uplinking matrix can be calculated in the following way. When the mobile station $M_j$ in FIG. 2 passes through the entire coverage area of base j, a noise power is generated in base i. The noise power varies with the instantaneous position of the interfering mobile station and its different noise power results can be characterized statistically by means of a distribution function.

a) The distribution function is calculated with a starting point from measured field strength values. The interference values are generated by performing a randomization according to the said distribution which can be implemented, for example, by allowing all interference results to be represented in table form and uniformly pointing out all numerical values in the table.

Assuming that a mobile station Mi passes through the coverage area i and in doing so experiences the coverage field strength Qi and a randomized interference field strength Qj at a given point in the coverage area. The noise figure q (q being the element Qij (Lqk) in the cross-interference matrix for uplinking) is defined as the fraction of the coverage area of base i for which it holds true that $$Qi/QJ < LQk.$$

Due to the fact that the interference field strength QJ is randomized, the ratio Qi/QJ is made a stochastic variable. The consequence is that q is also a stochastic variable which assumes new values each time the calculation is carried out. It is found in practice that the q values calculated in this way are assembled well around their mean value and that an individual result can be considered as representative. If it is not considered satisfactory, there is always the possibility of estimating the mean value of q by simulating the effect of the interfering mobile station several times in the way described above.

b) The distribution function is approximated by means of a logarithmically normal distribution. It is well known in the literature that interference field strengths originating from mobile stations situated at the same distance from the base have an almost logarithmically normal distribution. This applies also with good approximation to interference field strengths at a base from mobile stations in an adjoining coverage area. The log-normal distribution is completely determined by the mean value and spread, which parameters can be easily calculated from the given measured interference field strengths. Compared with case a), it is thus not the distribution function which is calculated but only the mean value and spread for the true distribution of interference values. The true distribution is further approximated with a logarithmically normal distribution. The median for the true logarithmated interference field strengths can be very well used as mean value in the lognormal distribution. The simulated interference powers are generated with the aid of a generator for normally distributed numerical values and with knowledge of the mean value and spread as above. The elements Qij (LQk) in the cross-interference matrix are calculated analogously to what has been said in a) above.

The power values Q in the base stations from the transmitting mobile stations are directly relateable to the power values P from the transmitting base stations due to the fact that the transmission losses between base and mobile station do not depend on the transmitting direction. Since the P-value is only obtained by measuring wave propagation data, this also applies to Q values.

To calculate the frequency compatibility, each coverage area must be studied with respect to all the other coverage areas. This must be done for all the threshold values corresponding to co-channel interference or adjacent-channel interference. It implies that all elements in all relevant cross-interference matrices must be calculated. Whilst processing measurement data, it is generally unavoidable to calculate all elements in the downlinking and uplinking matrices for the cross-interferences with respect to at least the co-channel case and the case of noise in the first adjacent channel, that is to say two cross-interference matrices must be calculated for downlinking and two for uplinking.

To make an allocation program which operates with cross-interference matrices as starting point works well but it is easier to edit and make changes in the matrices, which is necessary if the matrices are to be used in practice, if they have a simpler form with not so fully detailed information. This is the reason for going over to a simplified representation which is here called 10 exclusion matrix. In the matrix a distinction is made between at least three different degrees of interference which are usually designated, X or A in ascending degrees of difficulty. The symbol "." designates an interference which is negligible. The diagonal has elements which are usually designated by 0 and which indicate which base station the row or column in the matrix relates to, for example 0 in row number J means that all interferences relate to the coverage area of base station number j.

From the cross-interferences for downlinking with the elements Pij (LPk), for example, the corresponding exclusion matrix can be formed in the following way:

Assuming that the limit values for the same co-channel and the first adjacent channel are the only relevant ones, which implies that there are two cross-interference matrices Pij (LP1) and Pij (LP2). If the exclusion matrix is designated uij and the limit value of the degree of interference is px in both cases, the matrix elements uij are obtained in the following way uij = "0"; i=j
uij = "A"; Pij (LP2) > px
uij = "X"; Pij (LP1) > px
uij = "."; Pij (LP1) ≦ px The matrix elements vij in the uplinking matrix are formed in corresponding manner by using the cross-interference matrices Qij (LQ2) and Qij (LQ1) and corresponding limit values for the degree of interference py.

TABLE 3a

| | | | |
|---|---|---|---|
| 0.00 | 0.01 | 0.01 | 0.06 |
| 0.00 | 0.00 | 0.00 | 0.00 |
| 0.00 | 0.00 | 0.00 | 0.00 |
| 0.07 | 0.01 | 0.00 | 0.00 |

TABLE 3b

| | | | |
|---|---|---|---|
| 0.00 | 0.04 | 0.02 | 0.20 |
| 0.06 | 0.00 | 0.00 | 0.00 |
| 0.00 | 0.00 | 0.00 | 0.00 |
| 0.33 | 0.03 | 0.00 | 0.00 |

Table 3a shows an example of a cross-interference matrix Pij (LP2) and Table 3b shows a cross-interference matrix Pij (LP1). It holds true that Pij (LP2) ≦ Pij (LP1); for the rest, there is no connection between the matrices, neither are the matrices symmetric.

By using the above methods, an exclusion matrix can be calculated from the cross-interference matrices in the above tables for px=0.05. The exclusion matrix is shown in Table 4a, TABLE 4a

| |
|---|
| O..A |
| XO.. |
| ..O. |
| A..O |

The symbols ".", "X" and "A" correspond respond to interferences of increasing degree of difficulty. An interference corresponding to "." can be accepted as a co-channel interference. The symbol "0" indicates the coverage area to which the interferences in the same column relate. The matrix according to Table 4a can be interpreted as follows. A mobile station with coverage from base station 1 cannot share a channel for reception with a mobile station in coverage areas 2 and 4. However, it can share a channel with a mobile station in coverage area 3. It cannot use an adjacent channel to a channel used by a mobile station in coverage area 4. On the other hand, a mobile station with coverage from base station 2 can share a channel for reception with a mobile station in coverage area 1. A mobile station in coverage area 2 is thus not exposed to interferences from base station 1 but a mobile station in coverage area 1 is exposed to interferences from base station 2. Naturally, this implies in practice that the base stations 1 and 2 cannot use the same transmitting frequency. The consequence is that only symmetrical exclusion matrices have any practical value.

The exclusion matrix is therefore symmetrized by allowing matrix elements which represent the stronger degree of disturbance to be applicable. If the matrix in Table 4a is symmetrized, the matrix in the following Table 4b is obtained which in this case represents the downlinking TABLE 4b

| |
|---|
| OX.A |
| XO.. |
| ..O. |
| A..O —; |

An example of an uplinking matrix is given in Table 5.

TABLE 5

| | 1 | 2 | 3 | 4 |
|---|---|---|---|---|
| 1 | O | X | X | A |
| 2 | X | O | . | . |
| 3 | X | . | O | . |
| 4 | A | . | . | O |

According to this matrix, the base station 1 cannot share a channel with base stations 2, 3 and 4 nor can it have an adjacent channel to base station 4 in receiving mode. Base station 2 is exposed to negligible interference from mobile stations in the coverage areas of base station 3 and 4 and can therefore share a channel with these base stations, and so forth.

As mentioned earlier, it is desirable to make the same channel allocations in the uplinking and downlinking directions. To produce a matrix which can be used for forming the same allocation in both directions, the union of matrices U and V is defined. The union of two matrices is defined as the matrix with the union of corresponding elements in each matrix. The symbol for the union of two matrix elements is the symbol for the element which represents the stronger interference.

Table 6 shows the union of the matrices in Table 4b and 5

TABLE 6

| | 1 | 2 | 3 | 4 |
|---|---|---|---|---|
| 1 | O | X | X | A |
| 2 | X | O | . | . |
| 3 | X | . | O | . |
| 4 | A | . | . | O | exclusion matrix thus combined by combining its rows is used. If a certain control is required to the effect that small, individually permissible noise contributions do not add up too much during the process of allocation, for example, a further two levels "Y" and "Z" can be introduced in the following way. For the downlinking matrix, the matrix element is set as follows:

$u_{ij} = $ "O"; $i = j$ $u_{ij} = $ "A"; $P_{ij}$ (LP2) > px $u_{ij} = $ "X"; $P_{ij}$ (LP1) > px $u_{ij} = $ "Y"; $px/2 < P_{ij}$ (LP1) $\leq px$ $u_{ij} = $ "Z"; $px/4 < P_{ij}$ (LP1) $\leq px/2$ $u_{ij} = $ "."; $P_{ij}$ (LP1) $\leq px/4$ where px = limit value for the degree of interference in the same way as before. The exclusion matrix for the uplinking situation can be formed correspondingly in certain cases.

As mentioned before, the allocation is carried out by combining the rows in the exclusion matrix which is thus compressed. When the matrix cannot be compressed any further, a channel is allocated to each row in the matrix obtained.

There are many known variants of the algebraic procedure itself. These variants include different principles concerning which row should be used as a starting point in the matrix, which alternative should be selected from a large number of largely equivalent values in a given situation, different types of weighting in the calculation of the figure of merit controlling the procedure and so forth. There is no all-embracing theory on how to manage, but the procedures are heuristic and have been tested with computer simulations on random configurations of transmitters. These algorithms are certainly tested on random transmitter locations but the procedures themselves are deterministic, which means that each time the algorithm is run, exactly the same allocation is obtained for the same constellation of transmitters.

According to the invention, randomly controlled algorithms are used. In cases where a number of alternative actions happen to be almost equivalent, which is determined by calculating heuristic figures of merit, a randomization is carried out for selecting the continued course of the procedure.

The Applicant has implemented an allocation procedure specified by Hale on computer and it has been possible to make certain comparisons for mobile radio applications in Stockholm. It is thought that the randomly controlled allocation procedure can provide slightly less spectrum-effective allocations on average than the allocation obtained by means of the deterministic procedure. However, this is balanced by the fact that from the great number of allocations obtained by means of the randomly controlled procedure, single allocations can be obtained which are extremely good. A number of different allocations which solve the same problem provide the operator with more information than a single allocation which solves the current problem. Furthermore, certain secondary conditions which are difficult to formulate mathematically can be satisfied by a suitable selection of the required allocation from a number of allocations.

EXAMPLE

The invention is illustrated below by means of an example. 48 stations are placed out beforehand in the Stockholm area. The necessary field strengths have been measured or calculated so that the exclusion matrix can be formed as above. To simplify the discussion, it is assumed that no channels are preallocated, that is to say the allocation is carried out without boundary conditions.

1. Starting from a number of base stations, see Table 7, an exclusion matrix is formed, see Table 8.

TABLE 7

| NR  | CHANNEL | NAME         |
|-----|---------|--------------|
| 1.  | 0.      | AARSTA       |
| 2.  | 0.      | BOTKYRKA     |
| 3.  | 0.      | HALLONBERGEN |
| 4.  | 0.      | HUDDINGE     |
| 5.  | 0.      | HÖTORGET_N   |
| 6.  | 0.      | HÖTORGET_NO  |
| 7.  | 0.      | HÖTORGET_NV  |
| 8.  | 0.      | HÖTORGET_S   |
| 9.  | 0.      | HÖTORGET_SO  |
| 10. | 0.      | HÖTORGET_SV  |
| 11. | 0.      | ODENPLAN     |
| 12. | 0.      | ROSENLUND    |
| 13. | 0.      | RYDHOLM      |
| 14. | 0.      | SALTSJÖBADEN |
| 15. | 0.      | SANDHAMN     |
| 16. | 0.      | SKATTEHUSET  |
| 17. | 0.      | SKÄMOLMEN    |
| 18. | 0.      | SOLBERGA     |
| 19. | 0.      | SOLLENTUNA   |
| 20. | 0.      | STADION      |
| 21. | 0.      | STADSHAGEN   |
| 22. | 0.      | STAVSNÄS     |
| 23. | 0.      | STENHAMRA    |
| 24. | 0.      | STJÄRNHOV    |
| 25. | 0.      | STRÄNGNÄS    |
| 26. | 0.      | SUNDBYBERG   |
| 27. | 0.      | SV.HÖGARNA   |
| 28. | 0.      | SÄTRA        |
| 29. | 0.      | SÖDERTÄWE_C  |
| 30. | 0.      | TELESKOLAN   |
| 31. | 0.      | TOMTEBODA    |
| 32. | 0.      | TORÖ         |
| 33. | 0.      | TUMBA        |
| 34. | 0.      | TUNGELSTA    |
| 35. | 0.      | UPPLANDS_VÄSBY |
| 36. | 0.      | UPPSALA_N    |
| 37. | 0.      | UPPSALA_O    |
| 38. | 0.      | UPPSALA_S    |
| 39. | 0.      | UPPSALA_V    |
| 40. | 0.      | VALLENCUNA   |
| 41. | 0.      | VAXHOLM      |
| 42. | 0.      | VEDYXA       |
| 43. | 0.      | VÄLLINGBY    |
| 44. | 0.      | VÄSTERÅS     |
| 45. | 0.      | ÅRSTADAL     |
| 46. | 0.      | ÄLTA         |
| 47. | 0.      | ÖSTERMALM    |
| 48. | 0.      | ÖSTERSKÄR    |

```
0.0000   1.  O..X...X...X...X.X.X.......X.X..........XX..
0.0000   2.  .O.X............XX....XX...XX..XXX..........
0.0000   3.  ..O...X..X.X.......X.X...X.X..X....X......X.....
0.0000   4.  XX.O............XX.........X...XX...........
0.0000   5.  .....OXXXXX......X...XX....................X.
0.0000   6.  ....OXXXXXX....X...XX......................X..
0.0000   7.  ..X.XXOXXXX....X...X...X...XX................
0.0000   8.  X...XXXOXXXX....X...X........X.........XXX.
0.0000   9.  ...XXXXOXX...X...XX..........................XX.
0.0000  10.  ....XXXXXOXX...X...X.......X.XX.............X...
0.0000  11.  ..X.XXXXXXO.......X....X...X.................X.
0.0000  12.  X......X.X.O...X.X..X......X.X.............X...
```

TABLE 7-continued

```
0.0000  13.  ..X.........O....X............X....X.X......
0.0000  14.  ............OXX....X....X....X........X....X..
0.0000  15.  .............XO......X....X...  X........X......X
0.0000  16.  X...XXXXXX.X.X.O.X..X.........X............XXX.
0.0000  17.  .X.X............OX....X....X.X.X..............
0.0000  18.  XX.X........X...XXO.........X..X..XX........X...
0.0000  20.  ....XX..X.X........O..............X....X.
0.0000  21.  X.X.XXXXXX.X...X....O....X.X.XX............X.X...
0.0000  22.  .............XX......O....X....X.X.......X....X.X
0.0000  24.  .X.....................XOX...X..X..
0.0000  25.  ....................XXO..................X.....
0.0000  26.  ..X...X...X.....X.X.X.X..O.X..X..........X.....
0.0000  27.  .............XX.....X....O....X........X.......
0.0000  28.  XXXX.....X.X......XX..X.X..X..X.O.X........X.X..
0.0000  29.  .X............XX....O...XX...................
0.0000  30.  X...XX.XX.X.X...X.X..............X.O..............X...
0.0000  31.  ..X..X..XX........X....X...O................
0.0000  32.  .X...........XX......X.X....X...OXX...........
0.0000  33.  ..X.X............XX..........X....XOX.........X..
0.0000  34.  .X.X............X....X.....X....X.XXO..........X..
0.0000  35.  ..X..........X....X................O....XXX......X
0.0000  36.  .............................OXXX..X......
0.0000  37.  .............................XOXX..X......
0.0000  38.  .............................XXOX..X......
0.0000  39.  .............................XXXO..X......
0.0000  40.  ..........X...X............X......OXX.....X
0.0000  41.  ............XX...X.X.......X........X....XO.....X
0.0000  42.  ................X...............XXXXXX.O......
0.0000  43.  .X................X.X...X.X...............O.....
0.0000  44.  ..................X....................O....
0.0000  45.  X......X.X.X...X.X.X....X...X.X..............O...
0.0000  46.  X......XX....X.X...X..............XX........O..
0.0000  47.  ....XX.XX.X....X...X..........................O.
```

The exclusion matrix is symmetrized.

2. All rows in the matrix are allocated a figure of merit. The figure of merit is defined most simply with the aid of the concept of scalar product. For one row, the figure of merit is obtained by considering the row as a vector where the symbols ".", "X", "O" and "A" have , different integral-number weight and thereafter form the scalar product of the vector with themselves. Let the weights be zero for "." and "O" and a suitable integral-number value, for example 1, for "X" and "A". In certain connections, "A" can be allowed to have a higher integral-number weight, for example 2 or 3. If the integral-number weights are equal to 1, the figure of merit represents the sum of the number "X" and "A".

The figure of merit for a pair of vectors generally represents the scalar product between corresponding integral-number vectors. If the weights of "X" and "A" are equal to 1, the figure of merit represents the number of common "X" and "A". A high value of the figure of merit indicates in this case a geographic closeness and this can be interpreted so that a good value of the figure of merit tends to concentrate compatible base stations in the area. This is a different way of saying that short repetition intervals are aimed for, which, in turn is a prerequisite for good frequency economy.

The exclusion matrix is not necessarily to be symmetrized for the allocating algorithms to function. The figures of merit become slightly different which entails that the algorithms have different priorities in the random value. An advantage with a symmetrical matrix is that, on average, it needs fewer operations to carry out the allocations.

3. Selection of a first row in the matrix. This can be carried out by calculating the figure of merit for all rows and sorting the rows by decreasing figure of merit. Random selection of the row which represents the starting row from, for example, the 10 best rows.

4. When the starting row is determined, the rest of the rows are calculated which are compatible with the starting row. Sorting of these rows by figure of merit relative to the starting row by decreasing figure of merit. Random selection of the row which will be "added" to the starting row (the union is formed) from a fixed number of the best rows. After each addition, a new amount of compatible candidates is calculated and the procedure is repeated until there are no longer any compatible rows to be added.

5. Selection of a new starting row from the "free" number of rows in the same way as in 3. This row now represents the next channel in the allocation procedure. The rows which are compatible with this row are now calculated in the same way as in item 4.

6. The procedure according to item 5 is repeated again until no rows remain in the free set. A so-called allocation matrix has now been created according to Table 9.

TABLE 9

```
1.0 XXXOXXXXXXXXXXXXXXXOXOXOXXXXXXXXOXXXXXXXXOOXOXOOX
2.0 XXOXXXXOXXXXOXXOXXXXXXXOXXXOXXXXXXXXOXXXXXXOXXO
3.0 XXXXXXXXXXXXXXXXXXOXXXOXXXOXXOOXXOXXOXOXXXOXXX.XXXX
4.0 XOXXXOXXXXXXXXXXXXXOXX.OXXXOXXXXOXOXXXXX.XXXX
5.0 OXXXXXOXXXXOXOXXXX.XX...XXXXXXXOXXXXXOXXXO.XX.X
6.0 X...XOXXXXXO...X.X.XX......X.X.............X.X.
7.0 XX.XXXXOXXXX...XXO..X......X.X..XX..........XXX.
8.0 ..X.XXXXXXO........X.....X....X..............X.
9.0 ....XXXXXOXX...X....X......X.XX...............X...
```

| ANTAL KANALER: 9 | | | | | | | | | |
|---|---|---|---|---|---|---|---|---|---|
| 1.0 | 4 | 19 | 21 | 23 | 32 | 41 | 42 | 44 | 46 | 47 |
| 2.0 | 3 | 9 | 14 | 17 | 25 | 29 | 38 | 45 | 48 |
| 3.0 | 16 | 20 | 24 | 27 | 28 | 31 | 34 | 36 | 40 |
| 4.0 | 2 | 5 | 22 | 26 | 30 | 35 | 37 |
| 5.0 | 1 | 7 | 13 | 15 | 33 | 39 | 43 |
| 6.0 | 6 | 12 |
| 7.0 | 8 | 18 |
| 8.0 | 11 |
| 9.0 | 10 |

The upper part of the table shows the nine compressed rows which remain of the exclusion matrix according to Table 8. Each row corresponds to a potential channel and the sign 0 marks a station which is located in the channel. The lower part of Figure 9 contains the same information but, instead, for each 0 the column number is given. Thus, station numbers 4, 19, 21 and so forth are found in channel 1. In Table 10 the stations are listed in numerical order in a table like Table 7.

TABLE 10

| NR | CHANNEL | NAME |
|---|---|---|
| 1. | 5. | AARSTA |
| 2. | 4. | BOTKYRKA |
| 3. | 2. | HALLONBERGEN |
| 4. | 1. | HUDDINGE |
| 5. | 4. | HÖTORGET_N |
| 6. | 6. | HÖTORGET_NO |
| 7. | 5. | HÖTORGET_NV |
| 8. | 7. | HÖTORGET_S |
| 9. | 2. | HÖTORGET_SO |
| 10. | 9. | HÖTORGET_SV |
| 11. | 8. | ODENPLAN |
| 12. | 6. | ROSENLUND |
| 13. | 5. | RYDHOLM |
| 14. | 2. | SALTSJÖBADEN |
| 15. | 5. | SANDHAMN |
| 16. | 3. | SKATTEHUSET |
| 17. | 2. | SKÄMOLMEN |
| 18. | 7. | SOLBERGA |
| 19. | 1. | SOLLENTUNA |
| 20. | 3. | STADION |
| 21. | 1. | STADSHAGEN |
| 22. | 4. | STAVSNÄS |
| 23. | 1. | STENHAMRA |
| 24. | 3. | STJÄRNHOV |

TABLE 10-continued

| 25. | 2. | STRÄNGNÄS |
|---|---|---|
| 26. | 4. | SUNDBYBERG |
| 27. | 3. | SV.HÖGARNA |
| 28. | 3. | SÄTRA |
| 29. | 2. | SÖDERTÄWE_C |
| 30. | 4. | TELESKOLAN |
| 31. | 3. | TOMTEBODA |
| 32. | 1. | TORÖ |
| 33. | 5. | TUMBA |
| 34. | 3. | TUNGELSTA |
| 35. | 4. | UPPLANDS_VÄSBY |
| 36. | 3. | UPPSALA_N |
| 37. | 4. | UPPSALA_O |
| 38. | 2. | UPPSALA_S |
| 39. | 5. | UPPSALA_V |
| 40. | 3. | VALLENTUNA |
| 41. | 1. | VAXHOLM |
| 42. | 1. | VEDYXA |
| 43. | 5. | VÄLLINGBY |
| 44. | 1. | VÄSTERÅS |
| 45. | 2. | ÅRSTADAL |
| 46. | 1. | ÄLTA |
| 47. | 1. | ÖSTERMALM |
| 48. | 2. | ÖSTERSKÄR |

The above procedure is exemplified in the concluding table in Table 11 which is a table of a random selection of compatible rows.

TABLE 11

| 48 | 0 | 47 | 0 | 46 | 0 | 45 | 0 | 44 | 0 |
|---|---|---|---|---|---|---|---|---|---|
| 43 | 0 | 42 | 0 | 41 | 0 | 40 | 0 | 39 | 0 |
| 38 | 0 | 37 | 0 | 36 | 0 | 35 | 0 | 34 | 0 |
| 33 | 0 | 32 | 0 | 31 | 0 | 30 | 0 | 29 | 0 |
| 28 | 0 | 27 | 0 | 26 | 0 | 25 | 0 | 24 | 0 |
| 23 | 0 | 22 | 0 | 21 | 0 | 20 | 0 | 19 | 0 |
| 18 | 0 | 17 | 0 | 16 | 0 | 15 | 0 | 14 | 0 |
| 13 | 0 | 12 | 0 | 11 | 0 | 10 | 0 | 9 | 0 |
| 8 | 0 | 7 | 0 | 6 | 0 | 5 | 0 | 4 | 0 |
| 3 | 0 | 2 | 0 | 1 | 0 | | | | |
| KANAL 1: 46 | | | | | | | | | |
| 21 | 4 | 32 | 4 | 18 | 4 | 4 | 3 | 47 | 3 |
| 45 | 3 | 10 | 3 | 7 | 3 | 6 | 3 | 5 | 3 |
| 30 | 3 | 12 | 3 | 15 | 2 | 29 | 2 | 2 | 2 |
| 27 | 2 | 41 | 2 | 11 | 2 | 48 | 1 | 17 | 1 |
| 28 | 1 | 20 | 1 | 44 | 0 | 43 | 0 | 42 | 0 |
| 40 | 0 | 39 | 0 | 38 | 0 | 37 | 0 | 36 | 0 |
| 35 | 0 | 31 | 0 | 26 | 0 | 25 | 0 | 24 | 0 |
| 23 | 0 | 19 | 0 | 13 | 0 | 3 | 0 | | |
| KANAL 1: 21 | | | | | | | | | |
| 11 | 9 | 18 | 8 | 47 | 5 | 32 | 4 | 4 | 4 |
| 19 | 3 | 17 | 3 | 2 | 3 | 20 | 3 | 15 | 2 |
| 29 | 2 | 27 | 2 | 41 | 2 | 23 | 2 | 48 | 1 |
| 13 | 1 | 35 | 1 | 44 | 0 | 42 | 0 | 40 | 0 |
| 39 | 0 | 38 | 0 | 37 | 0 | 36 | 0 | 25 | 0 |
| 24 | 0 | | | | | | | | |

TABLE 11-continued

KANAL 1: 32

| | | | | | | | | |
|---|---|---|---|---|---|---|---|---|
| 18 | 9 | 11 | 9 | 4 | 5 | 47 | 5 | 29 | 4 |
| 17 | 4 | 23 | 4 | 41 | 4 | 20 | 3 | 19 | 3 |
| 48 | 2 | 13 | 1 | 35 | 1 | 25 | 1 | 44 | 0 |
| 42 | 0 | 40 | 0 | 39 | 0 | 38 | 0 | 37 | 0 |
| 36 | 0 | | | | | | | |

KANAL 1: 4

| | | | | | | | | |
|---|---|---|---|---|---|---|---|---|
| 11 | 9 | 23 | 5 | 47 | 5 | 29 | 4 | 41 | 4 |
| 20 | 3 | 19 | 3 | 48 | 2 | 13 | 1 | 35 | 1 |
| 25 | 1 | 44 | 0 | 42 | 0 | 40 | 0 | 39 | 0 |
| 38 | 0 | 37 | 0 | 36 | 0 | | | |

KANAL 1: 23

| | | | | | | | | |
|---|---|---|---|---|---|---|---|---|
| 11 | 9 | 47 | 5 | 41 | 4 | 19 | 3 | 20 | 3 |
| 48 | 2 | 44 | 1 | 35 | 1 | 13 | 1 | 42 | 0 |
| 40 | 0 | 39 | 0 | 38 | 0 | 37 | 0 | 36 | 0 |

KANAL 1: 47

| | | | | | | | |
|---|---|---|---|---|---|---|---|
| 41 | 5 | 19 | 3 | 48 | 2 | 44 | 1 | 35 | 1 |
| 13 | 1 | 42 | 0 | 40 | 0 | 39 | 0 | 38 | 0 |
| 37 | 0 | 36 | 0 | | | | | |

KANAL 1: 41

| | | | | | | | |
|---|---|---|---|---|---|---|---|
| 19 | 5 | 13 | 3 | 42 | 2 | 44 | 1 | 39 | 0 |
| 38 | 0 | 37 | 0 | 36 | 0 | | | |

KANAL 1: 42

| | | |
|---|---|---|
| 19 | 6 | 44 | 1 |

KANAL 1: 19

| | | | | | | | | |
|---|---|---|---|---|---|---|---|---|
| 48 | 0 | 45 | 0 | 43 | 0 | 40 | 0 | 39 | 0 |
| 38 | 0 | 37 | 0 | 36 | 0 | 35 | 0 | 34 | 0 |
| 33 | 0 | 31 | 0 | 30 | 0 | 29 | 0 | 28 | 0 |
| 27 | 0 | 26 | 0 | 25 | 0 | 24 | 0 | 22 | 0 |
| 20 | 0 | 18 | 0 | 17 | 0 | 16 | 0 | 15 | 0 |
| 14 | 0 | 13 | 0 | 12 | 0 | 11 | 0 | 10 | 0 |
| 9 | 0 | 8 | 0 | 7 | 0 | 6 | 0 | 5 | 0 |
| 3 | 0 | 2 | 0 | 1 | 0 | | | |

KANAL 2: 45

| | | | | | | | | |
|---|---|---|---|---|---|---|---|---|
| 7 | 5 | 6 | 4 | 5 | 4 | 9 | 4 | 26 | 2 |
| 43 | 2 | 17 | 2 | 11 | 2 | 31 | 2 | 3 | 2 |
| 2 | 2 | 14 | 1 | 34 | 1 | 33 | 1 | 48 | 0 |
| 40 | 0 | 39 | 0 | 38 | 0 | 37 | 0 | 36 | 0 |
| 35 | 0 | 29 | 0 | 27 | 0 | 25 | 0 | 24 | 0 |
| 22 | 0 | 20 | 0 | 15 | 0 | 13 | 0 | | |

KANAL 2: 9

| | | | | | | | | |
|---|---|---|---|---|---|---|---|---|
| 3 | 4 | 31 | 4 | 26 | 4 | 14 | 2 | 43 | 2 |
| 17 | 2 | 34 | 2 | 33 | 2 | 2 | 2 | 22 | 1 |
| 48 | 0 | 40 | 0 | 39 | 0 | 38 | 0 | 37 | 0 |
| 36 | 0 | 35 | 0 | 29 | 0 | 27 | 0 | 25 | 0 |
| 24 | 0 | 15 | 0 | 13 | 0 | | | |

KANAL 2: 14

| | | | | | | | | |
|---|---|---|---|---|---|---|---|---|
| 34 | 4 | 26 | 4 | 31 | 4 | 3 | 4 | 48 | 3 |
| 2 | 3 | 33 | 3 | 43 | 2 | 17 | 2 | 40 | 1 |
| 35 | 1 | 24 | 1 | 39 | 0 | 38 | 0 | 37 | 0 |
| 36 | 0 | 29 | 0 | 25 | 0 | 13 | 0 | | |

KANAL 2: 3

| | | | | | | | | |
|---|---|---|---|---|---|---|---|---|
| 48 | 4 | 40 | 4 | 34 | 4 | 17 | 3 | 33 | 3 |
| 2 | 3 | 24 | 1 | 39 | 0 | 38 | 0 | 37 | 0 |
| 36 | 0 | 29 | 0 | 25 | 0 | | | |

KANAL 2: 48

| | | | | | | | |
|---|---|---|---|---|---|---|---|
| 34 | 4 | 17 | 3 | 33 | 3 | 2 | 3 | 24 | 1 |
| 39 | 0 | 38 | 0 | 37 | 0 | 36 | 0 | 29 | 0 |
| 25 | 0 | | | | | | | |

KANAL 2: 17

| | | | | | | |
|---|---|---|---|---|---|---|
| 34 | 7 | 29 | 3 | 24 | 3 | 25 | 1 | 39 | 0 |
| 38 | 0 | 37 | 0 | 36 | 0 | | | |

KANAL 2: 25

| | | | | | | |
|---|---|---|---|---|---|---|
| 34 | 7 | 29 | 4 | 39 | 0 | 38 | 0 | 37 | 0 |
| 36 | 0 | | | | | | | |

KANAL 2: 29

| | | | | |
|---|---|---|---|---|
| 39 | 0 | 38 | 0 | 37 | 0 | 36 | 0 |

KANAL 2: 28

| | | | | | | | | |
|---|---|---|---|---|---|---|---|---|
| 43 | 0 | 40 | 0 | 39 | 0 | 37 | 0 | 36 | 0 |
| 35 | 0 | 34 | 0 | 33 | 0 | 31 | 0 | 30 | 0 |
| 28 | 0 | 27 | 0 | 26 | 0 | 24 | 0 | 22 | 0 |
| 20 | 0 | 18 | 0 | 16 | 0 | 15 | 0 | 13 | 0 |
| 12 | 0 | 11 | 0 | 10 | 0 | 8 | 0 | 7 | 0 |
| 6 | 0 | 5 | 0 | 2 | 0 | 1 | 0 | | |

KANAL 3: 36

| | | | | | | | | |
|---|---|---|---|---|---|---|---|---|
| 13 | 1 | 40 | 1 | 35 | 1 | 43 | 0 | 34 | 0 |
| 33 | 0 | 31 | 0 | 30 | 0 | 28 | 0 | 27 | 0 |
| 26 | 0 | 24 | 0 | 22 | 0 | 20 | 0 | 18 | 0 |
| 16 | 0 | 15 | 0 | 12 | 0 | 11 | 0 | 10 | 0 |
| 8 | 0 | 7 | 0 | 6 | 0 | 5 | 0 | 2 | 0 |
| 1 | 0 | | | | | | | |

KANAL 3: 34

| | | | | | | | | |
|---|---|---|---|---|---|---|---|---|
| 24 | 3 | 1 | 3 | 28 | 3 | 16 | 2 | 15 | 2 |
| 27 | 2 | 8 | 1 | 40 | 1 | 35 | 1 | 13 | 1 |
| 30 | 1 | 12 | 1 | 43 | 0 | 31 | 0 | 26 | 0 |
| 20 | 0 | 11 | 0 | 10 | 0 | 7 | 0 | 6 | 0 |
| 5 | 0 | | | | | | | |

KANAL 3: 16

| | | | | | | | | |
|---|---|---|---|---|---|---|---|---|
| 28 | 9 | 11 | 7 | 20 | 4 | 27 | 3 | 15 | 3 |
| 24 | 3 | 31 | 3 | 26 | 2 | 43 | 1 | 40 | 1 |
| 35 | 1 | 13 | 1 | | | | | |

KANAL 3: 20

| | | | | | | | | |
|---|---|---|---|---|---|---|---|---|
| 28 | 9 | 31 | 4 | 27 | 4 | 15 | 4 | 24 | 3 |
| 26 | 3 | 35 | 2 | 40 | 2 | 43 | 1 | 13 | 1 |

KANAL 3: 24

| | | | | | | | |
|---|---|---|---|---|---|---|---|
| 28 | 10 | 27 | 4 | 26 | 4 | 15 | 4 | 31 | 4 |
| 35 | 2 | 40 | 2 | 43 | 1 | 13 | 1 | | |

KANAL 3: 28

| | | | | | | | |
|---|---|---|---|---|---|---|---|
| 31 | 6 | 27 | 4 | 15 | 4 | 35 | 3 | 40 | 2 |
| 13 | 2 | | | | | | | |

KANAL 3: 31

| | | | | | | |
|---|---|---|---|---|---|---|
| 27 | 4 | 15 | 4 | 35 | 3 | 40 | 2 | 13 | 2 |

KANAL 3: 40

| | | |
|---|---|---|
| 15 | 4 | 27 | 4 |

KANAL 3: 27

| | | | | | | | | |
|---|---|---|---|---|---|---|---|---|
| 43 | 9 | 39 | 0 | 37 | 0 | 35 | 0 | 33 | 0 |
| 30 | 0 | 26 | 0 | 22 | 0 | 18 | 0 | 15 | 0 |
| 13 | 0 | 12 | 0 | 11 | 0 | 10 | 0 | 8 | 0 |
| 7 | 0 | 6 | 0 | 5 | 0 | 2 | 0 | 1 | 0 |

KANAL 4: 37

| | | | | | | | | |
|---|---|---|---|---|---|---|---|---|
| 13 | 1 | 35 | 1 | 43 | 0 | 33 | 0 | 30 | 0 |
| 26 | 0 | 22 | 0 | 18 | 0 | 15 | 0 | 12 | 0 |
| 11 | 0 | 10 | 0 | 8 | 0 | 7 | 0 | 6 | 0 |
| 5 | 0 | 2 | 0 | 1 | 0 | | | |

KANAL 4: 30

| | | | | | | | | |
|---|---|---|---|---|---|---|---|---|
| 6 | 5 | 5 | 5 | 11 | 3 | 26 | 3 | 43 | 2 |
| 2 | 2 | 35 | 1 | 33 | 1 | 13 | 1 | 22 | 0 |
| 15 | 0 | | | | | | | |

KANAL 4: 5

| | | | | | | | |
|---|---|---|---|---|---|---|---|
| 26 | 4 | 43 | 2 | 2 | 2 | 35 | 1 | 33 | 1 |
| 13 | 1 | 22 | 0 | 15 | 0 | | | |

KANAL 4: 35

| | | | | | | | |
|---|---|---|---|---|---|---|---|
| 26 | 6 | 43 | 4 | 2 | 2 | 22 | 2 | 15 | 2 |
| 33 | 1 | | | | | | | |

KANAL 4: 22

| | | | | | |
|---|---|---|---|---|---|
| 26 | 6 | 43 | 4 | 33 | 4 | 2 | 4 |

KANAL 4: 26

| | | |
|---|---|---|
| 2 | 6 | 33 | 5 |

KANAL 4: 2

| | | | | | | | | |
|---|---|---|---|---|---|---|---|---|
| 43 | 0 | 39 | 0 | 33 | 0 | 18 | 0 | 15 | 0 |
| 13 | 0 | 12 | 0 | 11 | 0 | 10 | 0 | 8 | 0 |
| 7 | 0 | 6 | 0 | 1 | 0 | | | |

KANAL 4: 43

| | | | | | | | |
|---|---|---|---|---|---|---|---|
| 7 | 3 | 12 | 2 | 11 | 2 | 10 | 2 | 1 | 2 |
| 13 | 2 | 6 | 1 | 8 | 1 | 18 | 1 | 39 | 0 |
| 33 | 0 | 15 | 0 | | | | | |

KANAL 5: 1

| | | | | | | | |
|---|---|---|---|---|---|---|---|
| 10 | 7 | 7 | 6 | 6 | 3 | 33 | 3 | 11 | 3 |
| 13 | 2 | 39 | 0 | 15 | 0 | | | |

KANAL 5: 7

| | | | | |
|---|---|---|---|---|
| 33 | 3 | 13 | 2 | 39 | 0 | 15 | 0 |

KANAL 5: 15

| | | | |
|---|---|---|---|
| 33 | 4 | 13 | 2 | 39 | 0 |

KANAL 5: 13

| | |
|---|---|
| 33 | 4 | 39 | 1 |

KANAL 5: 33

| | | | | | | | |
|---|---|---|---|---|---|---|---|
| 18 | 0 | 12 | 0 | 11 | 0 | 10 | 0 | 8 | 0 |
| 6 | 0 | | | | | | | |

KANAL 6: 12

| | |
|---|---|
| 6 | 4 | 11 | 2 |

KANAL 6: 6

| | | | |
|---|---|---|---|
| 18 | 0 | 11 | 0 | 10 | 0 | 8 | 0 |

KANAL 7: 8

| |
|---|
| 18 | 5 |

TABLE 11-continued

```
KANAL 7: 18
 11   0   10   0
KANAL 8: 11
 10   0
KANAL 9: 10
```

For this special case, all rows in the exclusion matrix have been allocated the same figure of merit even though the number "X" differs between different rows. The pair of numbers in the table shows on the one hand the row number and on the other hand the figure of merit in a selection of corresponding rows. The very first part-table has at the top the pair of numbers representing all conceivable 48 rows and all have the same figure of merit defined as zero in this particular case. It is therefore immaterial which starting row is used and in this case row number 46 has been randomly selected. In the next part-table, all rows are shown which are compatible with row no. 46 and the figures of merit of these rows. These figures of merit are calculated as scalar products as above. The figure of merit 4 in (21 4) thus represents the number of common "X" in rows 46 and 21. Among the five rows which have the highest figure of merit row 21 is randomly selected, which is thus added to row 46. In continuation, rows 32, 4, 23, 47, 41, 42, 19 and 44 are also added. These compatible rows represent the same number of base stations with associated coverage areas and all these base stations can use the same channel 1 for transmitting and receiving (channel 1 is located both in the uplinking band and the downlinking band).

When all rows corresponding to channel 1 are added, a new starting row is randomly selected in this special case from the free set, by means of which channel 45 is obtained.

The above procedure is repeated and randomizations cause the rows 45, 9, 14, 3, 48, 17, 25, 29 and 38 to be arranged together to form a single row which corresponds to channel 2.

When a new starting row has been selected 9 times, no rows are left in the free set and no further rows exists which is compatible with row 10. The allocation procedure is thereby concluded.

With channel allocation in the microcell system in, for example, Stockholm, channel allocations in a surrounding area of Stockholm must be taken into consideration, that is to say the allocation is made towards a certain boundary. The boundary can also include arbitrary base stations in Stockholm which for one or other reason must stay fixed with respect to channel. This condition is only controlled by means of the algebraic allocation procedure by combining all rows in the exclusion matrix which correspond to one and the same channel. With the continued allocation, the row operations act as allocation restriction with the given channel spacing.

According to the invention, a control of the total degree of interference is made possible. According to what was said before, an allocating algorithm involves the purely algebraic execution of a number of row operations in a cross-interference matrix or symmetrized exclusion matrix. Small matrix element values in cross-interference matrices are with good approximation additive when rows are combined. This is due to the fact that the interference contributions from different transmitters in the same coverage area are independent of one another if the coverage area exposed to the interference does not constitute a significant part of the whole coverage. If the information from the cross-reference matrices for uplinks and downlinks is accessible with the allocation procedure, the resultant incident interference relating to the interference characteristics in different coverage areas can be sufficiently controlled during the allocation process by adding corresponding elements in the cross-interference matrices. If during this process a limit value is exceeded, this is a further restriction on the combining of rows in the exclusion matrix. An example of a very simple implementation of this principle is the introduction of levels "Y" and "Z" into the exclusion matrix as above.

If it is noticed that the traffic demand of a base station increases until it doubles, measures can be taken against this by copying the item for this base station in the exclusion matrix one more time with the aid of a text editor. A specially developed handling program is used for renumbering all items with respect to the additional item introduced, after which the allocating algorithm is repeated with the new item.

An interference degree B can also be included in the exclusion matrix which implies that the interference is not negligible in the second adjacent channel. Naturally, this implies a further restriction on the combining of rows. The symbol B will not be found in the same column in less than or equal to two rows from the symbol 0 in a current row. Figure 6 shows an example of the final allocating matrix. There must therefore be two rows between the symbols 0 and B in the same column, see, for example, rows 3 and 6.

A further aid to the resource allocation is a plotting program which creates plots of the interference situation. This is because the elements in an exclusion matrix belong to one of the following three classes:

1. Obvious non-exclusions, for example between cells at a very long distance from one another. It is sufficient to calculate that the coverage areas do not overlap one another, that is to say a trivial calculation.

2. Obvious exclusions between, for example, cells which are grouped together, that is to say cells which share the same mast or antenna. Collective groupings are easily found by comparing the coordinates of the stations.

3. Uncertain pairs of cells where it is difficult to decide whether there is an exclusion or not. The number of uncertain pairs is a much lower number than the number of all cell pairs.

When designing an exclusion matrix, only the elements in the cross-interference matrices which relate to uncertain cell pairs must be calculated, strictly speaking. This is suitably done with the algorithms which have been specified earlier in combination with the plotting program which produces plots of downlinks and uplinks for current cell pairs. For the uplink, the Monte-Carlo methods specified in a) and b) are to be preferred. The plotting program calculates the degree of interference (the value of the corresponding elements in the cross-interference matrix) and provides a visual image of the interference situation which provides for extremely accurate planning of the cell and its interaction with other cells. The planning can now be carried out not only by taking into account the noise figure but also with respect to the total interference pattern and keeping in mind system-related aspects such as, for example, hand-over boundaries. It is possible to vary base station powers in power classes for mobile stations and also to regulate the coverage individually for each cell. This can be done simultaneously both for uplinking and downlinking. In addition, it is no longer necessary to be bound to a fixed limit value for the noise figure, but the cells can be planned individually with respect to the unique interference pattern.

For example, if the interferences do not create any problem with normal traffic loading, these interferences can be considered in these cases as belonging to the coverage area of another cell. The method is exacting work but provides a result of the highest quality.

Figure 3:
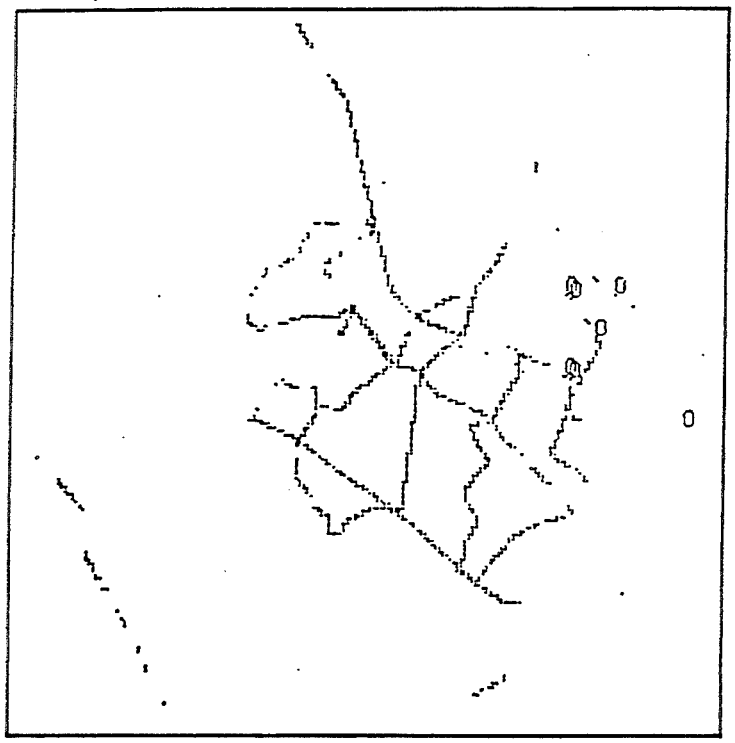
FIGS. 3–5 are examples of plots of different interference situations
Figure 4:
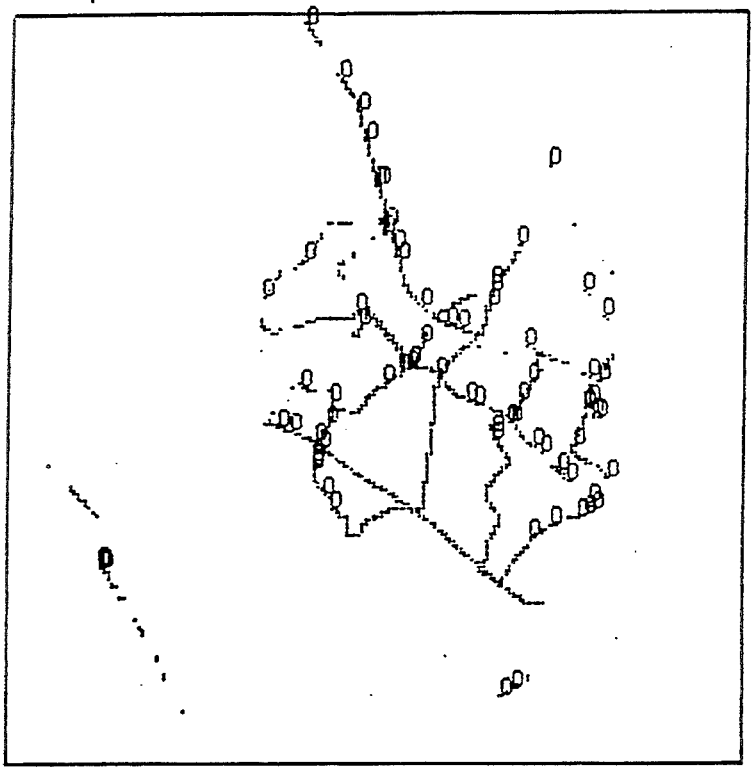
Figure 5:
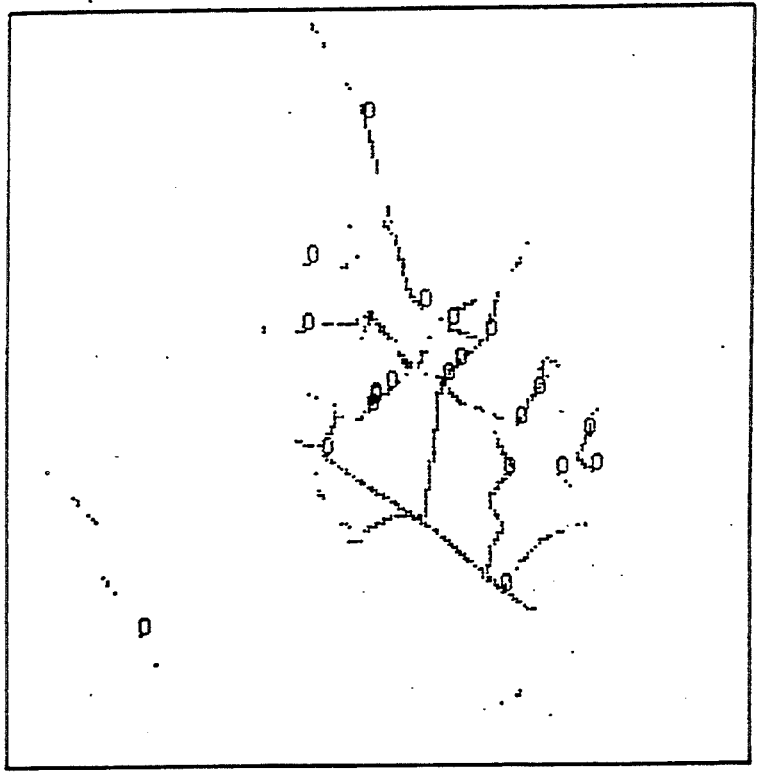

FIGS. 3–5 show plots of the service area of the base station in Vällingby with respect to interferences from the coverage area around the base station at Odenplan. The downlinking situation is illustrated in FIG. 13 where the limit value for coverage is −93 dBm. The coverage is represented by plotted line segments, the interferences from Odenplan being designated by 0. The degree of interference, that is to say the element in the cross-interference matrix, is calculated as 0.8%.

FIG. 4 shows a plot for a corresponding situation in the uplink. It is thus a picture of how the mobile stations in the coverage area of the base station at Odenplan interfere with the base station in Vällingby. The degree of interference is here approximately ten times higher than in the downlink.

FIG. 5 shows a plot of the uplink situation when the limit value for coverage is raised to −88 dBm. The coverage area has been slightly reduced but the interference situation has become acceptable with a degree of interference of approximately 4%.

According to the embodiment of the invention described here, measured field strength values have been used to construct the exclusion matrix. However, the invention does not exclude the use of calculated field strength values if these are accessible. The invention is only limited by the patent claims below.

We claim:

1. A method for allocating resources in a radio system comprising the steps of:
   providing a plurality of base stations;
   associating a coverage area for each of said base stations;
   providing a plurality of mobile stations that can move between or within the coverage areas;
   determining the area of interaction between base stations and their coverage areas by measurements;
   calculating a merit figure for each of said base stations and placing the merit figures in rows of a matrix;
   randomly selecting a row of said matrix as a starting row;
   determining, from the remaining rows, which rows are compatible with the starting row in order to determine the best rows, randomly selecting a row from the subset of the best rows to be added to the starting row, and;
   repeating said calculating, selecting and determining steps until there are no longer any compatible rows;
   choosing a row from the remaining rows; and
   assigning transmitting and receiving frequencies for each base station based upon the choosing step.

2. A method as in claim 1 wherein the step of determining from the remaining rows further comprising the steps of:
   compressing of said matrix; and
   repeating said compressing step of said matrix until no further compression is possible.

3. A method as in claim 2 wherein said selecting step comprises:
   a plurality of random selection techniques.

4. A method as in claims 1, 2, or 3 wherein said step of calculating further comprising the step of:
   producing a scalar product between vectors in said matrix.

5. A method as in claim 4 wherein said step of determining further comprises:
   representing the interaction by a cross-interference matrix with elements in the form of numerical values.

6. A method as in claim 4 wherein said step of determining further comprises:
   representing the interaction by an exclusion matrix with elements in symbol form.

7. A method as in claim 4 wherein said step of determining further comprises:
   representing the interaction by a cross-interference matrix with elements in the form of numerical values; and
   representing the interaction by an exclusion matrix with elements in symbol form.

* * * * *